United States Patent [19]

Shepherd

[11] Patent Number: 4,815,690
[45] Date of Patent: Mar. 28, 1989

[54] APPARATUS FOR THE PRODUCTION OF MONOLITHIC INTRAOCULAR IMPLANTS

[76] Inventor: Thomas H. Shepherd, 12 N. Greenwood Ave., Hopewell, N.J. 08525

[21] Appl. No.: 153,974

[22] Filed: Feb. 9, 1988

[51] Int. Cl.[4] .................. B29D 11/00; B29C 33/10
[52] U.S. Cl. .................. 249/82; 249/134; 249/141; 249/160; 264/2.2; 425/808; 623/6
[58] Field of Search .............. 249/82, 98, 105, 134, 249/160, 117, 141; 425/808; 264/1.1, 1.7, 1.8, 2.2, 2.3, 2.7, 328.9; 623/6

[56] References Cited

U.S. PATENT DOCUMENTS

| | | | |
|---|---|---|---|
| 4,121,896 | 10/1978 | Shepherd | 425/412 |
| 4,182,723 | 1/1980 | Covington | 264/2.3 |
| 4,197,266 | 4/1980 | Clark et al. | 264/1 |
| 4,619,662 | 10/1986 | Juergen, Jr. | 425/808 |
| 4,681,295 | 7/1987 | Haardt et al. | 264/1.1 |

FOREIGN PATENT DOCUMENTS 59-106936  6/1984  Japan .................. 264/2.2

Primary Examiner—Jay H. Woo
Assistant Examiner—James C. Housel
Attorney, Agent, or Firm—Omri M. Behr

[57] ABSTRACT

There is provided a mold fabricated from thermoplastic material incorporatinog a thin flexible, substantially knife-edged rim projecting from the periphery of the mold cavity on both the male and female portions thereof, and having a reservoir to contain additional monomer, such reservoir being separated from the mold cavity by the conjunction or mating line of the peripheral rim projections.

Such molds are useful for the molding of optical implants which do not require further machining or similar treatment.

14 Claims, 2 Drawing Sheets

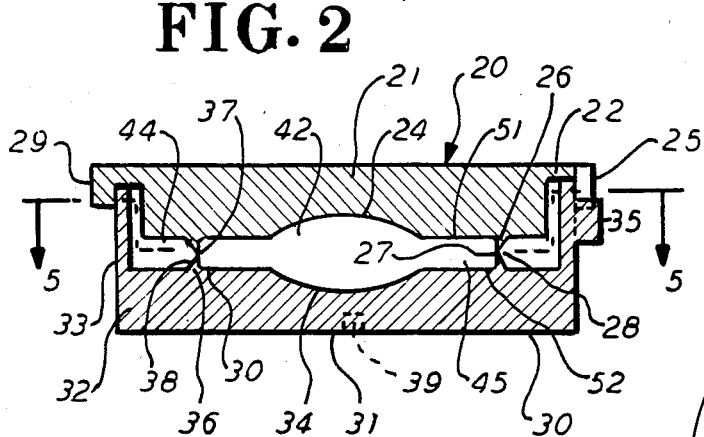
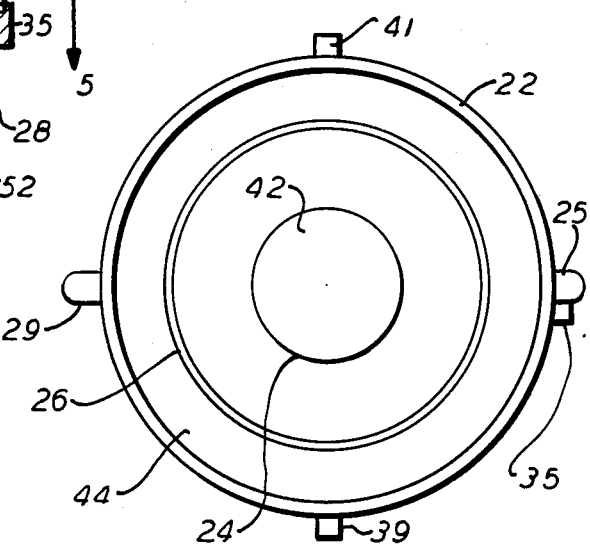
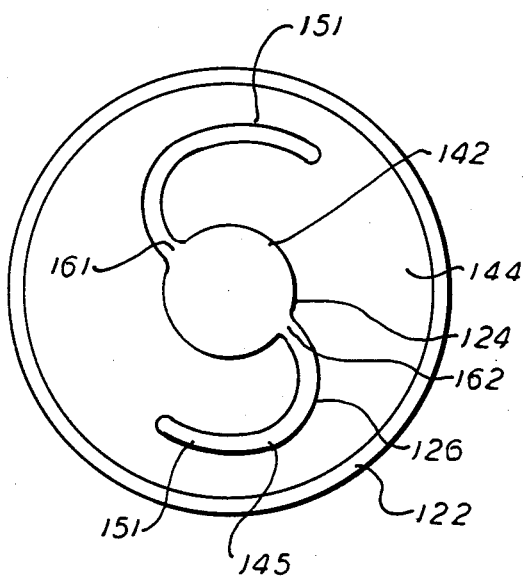
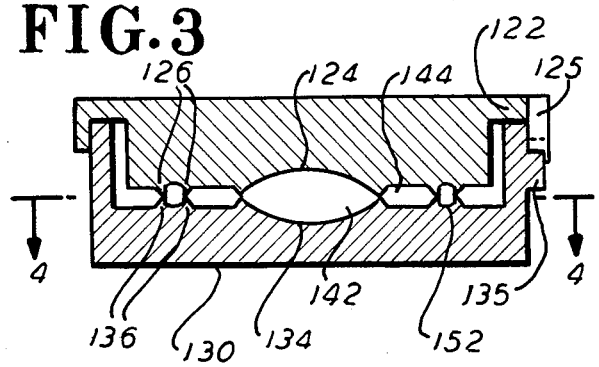
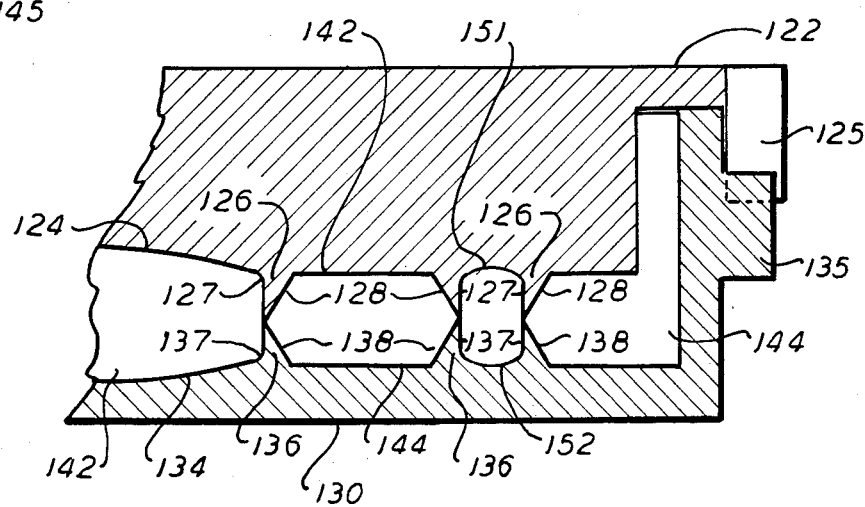

APPARATUS FOR THE PRODUCTION OF MONOLITHIC INTRAOCULAR IMPLANTS

BACKGROUND OF THE INVENTION

Intraocular implants, as used for replacement of the natural lens of the eye after removal of the latter to remediate cataracts, consist of a 6-7 mm. diameter magnifying lens (of approximately 60 diopters power as measured in air) in conjunction with peripheral loops or flanges designed to support the implant and maintain its centration in the optical axis of the eye.

A conventional method of manufacturing implants is to prepare, by machining and polishing, a circular lens of desired diameter from a suitable material such as polymethyl methacrylate, and then in subsequent operations, drill holes and attach supporting loops made of polypropylene or polymethyl methacrylate filaments. This method requires numerous operations and skilled labor to achieve satisfactory production. In another mode of manufacture, monolithic implants are produced using automatic mills to cut both the optic portion and supporting loops, followed by a lengthy polishing operation to achieve suitable optical surfaces on the implant. Both these methods suffer from the need for multiple operations and the use of polishing compounds which have been shown to be deleterious to the eye unless rigorously removed.

It is the object of this invention to produce directly monolithic implants which require little or no subsequent finishing operation by casting, polymerization or vulcanization of suitable monomer mixtures or prepolymer materials in an inexpensively produced closed mold system.

DESCRIPTION OF THE PRIOR ART

The primary problem to overcome in using a closed mold system for casting of objects in which dimensional accuracy, surface finish, and edge regularity are important, is compensation for the shrinkage that occurs with polymerization. The conversion of most monomeric materials to the corresponding polymers is accompanied by a volumetric shrinkage in the range of 10-25%. U.S. Pat. No. 4,121,896 teaches a method for compensating for this shrinkage which is satisfactory for objects such as contact lenses which have a thickness of from 0.05 to 0.5 mm., by using a thermoplastic mold incorporating a thin flexible peripheral rim on one molding surface. However, the relatively high optical power required for intraocular implants necessitates thickness of the optical portion of up to 2.0 mm. and the degree of shrinkage compensation available with the molds of U.S. Pat. No. 4,121,896 is insufficient for objects over about 0.6 mm thick. Also, these molds suffer from the disadvantage that a relatively square edge is necessarily produced at the junction of the flexible rim with the opposing mold face. This square edge is not problematic with contact lenses, but would be an undesirable feature on the periphery of supporting loops or flanges of implants which are in pressured contact with either the sulcus or capsular bag of the eye.

U.S. Pat. No. 4,197,266 teaches a method of forming optical lenses by polymerization of monomers in a mold system incorporating a reservoir to hold additional monomer which flows into the mold cavity during the polymerization to compensate for the shrinkage involved. The reservoir is connected to the mold cavity by an annular gap and the polymerization must be carried out in a manner to ensure that the monomer mixture in the reservoir and annular gap is maintained in a fluid state until the polymerization in the mold cavity is largely complete. Polymerization conditions must be then be altered to effect polymerization of material remaining in the reservoir and gap. This is necessary to curtail the deleterious effect of unpolymerized monomer on the lens surface. For contact lenses, a subsequent machining operation is then required to cut away the excess polymerized material and form a finished edge. While this machining requirement is not a serious drawback for contact lenses which have a symmetrical axis of rotation, if this method were employed to produce many of the designs of intraocular implants, the plurality of peripheral curvatures presented would require complicated or multiple operations to finish the periphery of the implant.

DESCRIPTION OF THE INVENTION

The invention comprises a mold fabricated from thermoplastic material incorporating a thin flexible, substantially knife-edged rim projecting from the periphery of the mold cavity on both the male and female portions thereof, and having a reservoir to contain additional monomer; such reservoir being separated from the mold cavity by the conjunction or mating line of the peripheral rim projections.

In particular, the mold comprises a male portion comprising a core having a cavity therein which has a first molding surface having a principle longitudinal axis and having a predetermined curvature to form a first surface of the desired lens portion of said implant and a second molding surface, opening into said first molding surface and having a predetermined shape to provide a first surface of the support means for the lens and a first thin, flexible rim means having a lower edge, surrounding the edges of said first and second molding surfaces, the female portion of the mold similarly comprises a core having a cavity and a core ring surrounding said core, said cavity having a third molding surface having a principle longitudinal axis orientable coaxially with the principle longitudinal axis of said first molding surface, and having a predetermined curvature to form a second surface of the desired lens portion of the implant, a fourth molding surface, opening into said third molding surface and having a predetermined shape to provide the second surface of the support means and a second thin, flexible rim means having an upper edge, surrounding the edges of said third and fourth molding surfaces. The rim means of these male and female portions are mutually positioned to contactable at their respective lower and upper edges to form a contact seal between them and to provide a reservoir between the male core, the female core ring, the portion of the female core outside said rim means and both of the rim edges in contact with each other.

The inner surfaces of the flexible rims on the periphery of the mold cavity are angled either in a common plane or with their edges towards the cavity and the mating of the edges of flexible rims provides a continuous valve which permits flow of monomer from the reservoir into the cavity when pressure in the cavity drops due to polymerization shrinkage of the monomer mixture contained therein. The rim/valve arrangement remains closed when polymerization has progressed to the point that gelation of the monomer mixture has occurred and material transfer from the reservoir to the cavity has ceased. The flexible rims can then compress additionally to compensate for further shrinkage that occurs as polymerization is completed. This mating and inward flexing of the rims provides a smooth recessed parting line which requires no further finishing. In addition, this arrangement allows production of rounded edges on both sides of the implant.

The mold portions are produced by injection or compression molding in metal molds machined and polished to provide desired supporting loops or flanges and a magnifying optical section. In addition, the molds are provided with means for ensuring both radial and axial alignment upon closure.

BRIEF DESCRIPTION OF THE DRAWINGS

FIG. I shows examples of various implant designs which can be produced using the molds of the invention.

FIG. II shows a cross-sectional view of molds designed to produce implants D & F (FIG. I) if bisected along Axis 3-4.

Figure 1A:
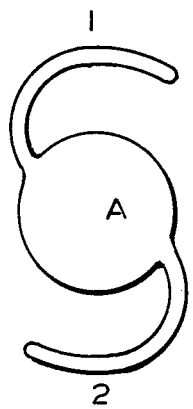
Figure 1B:
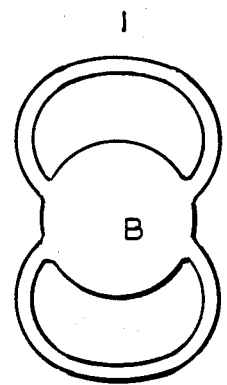
Figure 1C:
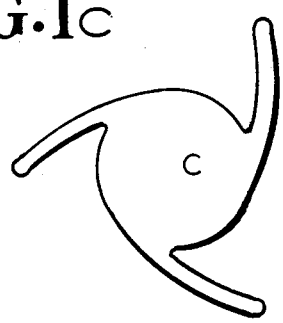
Figure 1D:
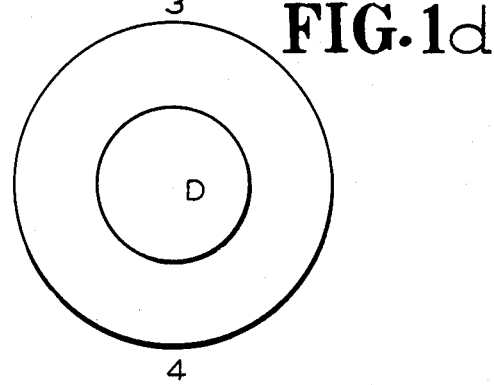
Figure 1E:
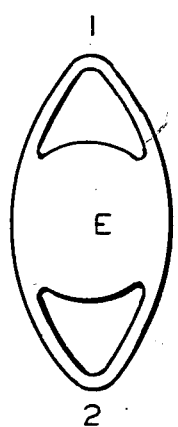
Figure 1F:
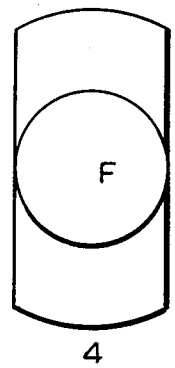

FIG. III shows a cross-sectional view of molds designed to produce implants A, B & E, if bisected along Axis 1-2.

FIG. IV shows an expanded view of a part of FIG. III illustrating the mode of closure of the flexible rims at the parting line of the molds and the resultant recess of the parting line.

FIG. V is a downward plan view of FIG. II taken at V—V.

FIG. VI is a downward plan view of FIG. IV taken at VI—VI.

DETAILED DESCRIPTION OF THE DRAWINGS

FIGS. II and V illustrate the simplest embodiment of the invention. The mold comprises two segments. The male segment 20 comprises a central core 21 circumferentially surrounded by core lip 22 which is integral therewith. In the preferred embodiment, there is provided at least one male alignment stud 25 attached to lip 22, having a small lateral separation from core 21. If desired, at least one further holding stud 29 is also provided, which is similarly attached to lip 22 and separated from core 21. As shown in FIG. V, studs 25 and 29 are at opposite ends of a diameter but such placement is not crucial to the invention.

A molding face 24 is provided in central core 21 and is surrounded first by second molding surface 51 and which in turn is surrounded by a flexible rim 26, having a face 27 suitably directed inwardly towards molding face 24 and an outer surface 28 facing outwardly of said molding surface 24.

The female segment 30 of the mold similarly comprises a core having a female central core 31, having a circumferential outer portion 32, said outer portion 32 being further provided with an upwardly directed outer ring 33, dimensioned as to height and width to fit into the space between male alignment stud 25 and male core 21 and, if present, between male holding stud 29 and core 21. The fit should be snug but should permit easy mutual rotation of the male and female segments. On one portion of said ring 32, there is provided, if desired, female alignment stud 35. The mutual contacting of alignment studs 25 and 35 serves to control the mutual positioning of the male and female segment. Female, third molding surface 34 is provided in female core 31 in such a way that molding surfaces 24 and 34 have a common longitudinal axis passing therethrough, and similarly by fourth molding surface 52. Optionally, as shown in FIG. V, there are provided a pair of holding studs 39 and 41, suitably but not critically at opposite ends of a diameter. At the outer edge of surface 52, there is provided a flexible rim 36, having an inner surface 37 suitably directed to towards molding surface 34 and an outer face 38, directed towards outer ring 33.

When the mold is assembled as shown in FIGS. II and V, the apices of flexible rims 26 and 36 just touch. While the invention is not limited thereto, it is preferred that the rims 26 and 36 or at any rate, the mutually contacting portions thereof, have a substantially triangular cross-section. It is further preferred that the inner surfaces 27 and 37 subtend an angle to each other at their line of contact of at least 180°. It is further preferred that the inner face 27 subtend an angle of between 10° and 30° to the outer face 28 at their common edge and that similarly, inner face 37 subtend a similar angle to outer face 38 at said common edge.

As stated heretofore, FIGS. II and V illustrate the mold configuration for occular inserts similar to those shown in FIG. I(D) and (F). FIGS. III, IV and VI illustrate the slight changes which are required in the mold format to provide an insert of the type of FIG. I(A, C & E). The numbers shown in FIGS. III, IV and VI correspond to substantially the same items as in FIG. II but, they are preceded by the digit 1.

It will thus be seen that in order to provide a device of FIG. I(A) say, the rims are positioned somewhat differently. Thus, it will be seen that FIG. VI which is a downward plan view of a male mold segment for a device of FIG. I(A), the first molding surface for the lens 124 opens to second molding surface 151 for the support means at locations 161 and 162. A similar situation will exist for the counterpart segments of the female segment of the mold. For reasons of consistency with the embodiments of FIGS. I(B), (C) and (E), only one item number is allocated for the second molding surface.

Similarly in FIG. IV, it will be seen that the support segments created between and second and fourth mold segments 151 are similarly bounded by inner faces 127 and 137, which subtend to each other an angle of, preferably, more than 180°.

In the operation of the device, a predetermined amount of monomer or monomer mixture including, if necessary, the appropriate amount of free radical initiator, is placed in the female portion of the mold. The male portion of the mold is then placed upon the female portion in such a manner that the apices of rims 26, 126 just touch the apices of rims 36, 136 and a small amount of monomer or monomer mixture is squeezed into reservoir space 144. Optionally, vacuum is applied to remove air from the volume to be molded. Polymerization is then commenced starting from the lens portion by administration of heat. The reduction in pressure of the contracting polymer causes the rims to flex minimally at their apex, permitting just the requisite amount of monomer to flow inwardly into the lens molding volume 42, 142 and support member volume 45, 145. Upon completion of polymerization, the lens portion and the support portion are both provided with smooth edges which avoid the problems of the prior art edges.

In general, the "height" or distance of projection of the thin flexible rim integrally formed on each mold member can be from 0.05 to as much as 0.30 mm. The apex of the rim should be as thin as possible, approaching a "knife edge" in dimension, to minimize irregularity at the parting line. The rim is delicate and mold halves much be carefully handled to avoid damage.

The outside dimension of the male mold core member 21 is suitably 0.1 to 0.5 mm. smaller than the inside dimension of the female mold outer ring 32 to provide reservoir volume additional to that created by the projection of the flexible rims and, the resulting annulus though a snug fit, is open to the atmosphere to prevent formation of a vacuum or pressure decrease in the reservoir during polymerization. Such pressure decrease in the reservoir would hinder transfer of polymerizing species during operation of the mold.

The advance in the art represented by the present invention depends on the interaction of several factors, one of which is the geometry of the mold herein described. Other factors are controlled by the nature of the materials used to fabricate the mold. The mold material used must be sufficiently rigid to preserve the predetermined curvatures of the optical surfaces of the mold, yet in thin sections must be sufficiently flexible under polymerization conditions to permit sufficient flexing to obtain the desired volumetric contraction of the mold cavity.

Suitable materials for construction of the molds are thermoplastic resins which are inert to the monomers or prepolymers used for casting of the implants, which do not strongly adhere to the polymerized species; which can be molded to a high quality optical surface; and which have the requisite flexibility under polymerizing conditions. Thermoplastic resins which have been found to be suitable include low, medium and high density polyethylene, or ethylene copolymers containing a preponderant proportion of ethylene; polypropylene, propylene copolymers containing a majority portion of propylene; polybutene-1, poly-4-methylpentene-1, polyacetal resins, polyaryl ethers, polyphenylene sulfides; polyaryl sulfones, polyvinyl chloride and polyamides, including polycaprolactam, polyhexamethylene adipamide; thermoplastic polyesters and various fluorine containing plastics.

In the practice of this invention, metal molds designed to produce the desired male and female thermoplastic molds are fabricated by traditional machining and polishing methods. The molds must be produced to a high degree of accuracy to achieve the desired results of this invention, since the flexible rims on the periphery of the mold cavity must mate exactly.

Although various methods may be used, depending on the configuration desired in the implant to be produced, the thin groove in the metal mold required to form the flexible rim is generally most conveniently produced by using a specially shaped fine engraving tool.

The metal molds are then used in injection or compression molding machines to produce the plastic molds of this invention. A very large number of plastic molds can be produced from a set of metal molds. The plastic molds are then used to cast the desired monolithic implants from polymerizable or vulcanizable mixtures. Although it is possible to reuse the plastic molds if handled with care, it is usually most efficient to discard or regrind and recycle the plastic material from once-used molds.

The design of the implants produced by this invention is not restricted to any particular set of parameters. All the designs illustrate bi-convex optics, however, plano convex optics can be produced as well, as can any desired configuration of supporting open or closed loops or flanges.

Any desired optical conformation can be produced including bi-focal or toric optics, as well as the conventional spherical magnifying lens.

Monomer, prepolymer, or vulcanizable mixtures useful in the practice of this invention include hydrophobic, acrylic esters, particularly lower alkyl acrylic esters, with the alkyl moiety containing 1–5 carbon atoms, such as methyl acrylate or methyacrylate, n-propyl acrylate or methacrylate, isopropyl acrylate or methacrylate or various mixtures of these monomers. For increased dimensional stability, resistance to warpage and to attain ability of the implant to undergo sterilization by autoclaving, the above monomer or monomer mixtures may be further admixed with a minor proportion of di- or polyfunctional polymerizable species to effect crosslinking of the polymer matrix as polymerization proceeds. Examples of such polyfunctional species include divinyl benzene, ethylene diacrylate or methacrylate, propylene diacrylate or methacrylate, acrylate or methacrylate esters of the following polyols: triethanol amine, glycerol, pentaerythritol, butylene glycol, diethylene glycol, triethylene glycol, mannitol, sorbitol and the like. Other crosslinking monomers include N,N-methylene-bis-acrylamide or methacrylamide, sulfonated divinyl benzene and divinyl sulfone.

Other monomeric materials suitable for producing implants via this invention are hydrophilic monomer mixtures forming three dimensional polymeric networks such as those disclosed in U.S. Pat. No. 3,822,089, which is incorporated herein by reference. In addition to hydrophilic acrylic monomers disclosed in the aforementioned patent, useful materials include mono- or di-N-alkyl substituted acrylamides or methacrylates and vulcanizable silicone fluids or elastomers.

It is essential when using hydrophilic monomers and mixtures thereof to form a crosslinked three-dimensional network on polymerization since the resultant materials adsorb water and become soft and flexible. Such materials would lack shape retention if not crosslinked. Suitable crosslinking monomers are those listed above for hydrophobic monomers.

Additionally, it may be desirable to employ mixtures of hydrophilic and hydrophobic monomers to effect alteration in the water content, physical properties, or refractive index of the resulting implant. Such hydrophilic/hydrophobic monomer combinations may be selected from the above listed materials.

Vulcanizable silicone and urethane prepolymer fluids may also be suitable implant materials for use in the practice of this invention.

Polymerization of the monomeric mixture is usually carried out using free radical catalysts of the type commonly used in vinyl polymerization. Such catalyst species include organic peroxides, organic percarbonate esters and inorganic materials, such as ammonium, sodium or potassium persulfate. These materials may be used in conjunction with various reducing agents to increase the rate of radical production.

Polymerization may also be effected through use of elevated temperatures, ultraviolet radiation, X-rays or radioactive decay.

In the practice of the invention, it is necessary to carry out the polymerization in such a manner that material contained in the reservoir section of the mold remains fluid until gelation of material in the cavity section of the mold has occurred. U.S. Pat. No.

4,197,266, which is incorporated herein by reference, discloses a method of effecting this by using radiation initiation of polymerization with the radiation impinging on the center of the mold cavity while using a diaphragm or mask to prevent radiation from reaching the periphery and the mold cavity or reservoir area during the initial stages of polymerization.

It has been discovered that the same effect can be obtained by using thermal means with free radical initiation. Since polymerization commences first in the thicker sections of the cavity, if the dimensions of the reservoir are maintained in a conformation substantially thinner than that of the mold cavity, polymerizable material in the reservoir will remain fluid longer than that in the cavity and the desired effect of this part of the invention is obtained.

This invention is further illustrated by the following examples.

EXAMPLE I

Formation of Molds

Steel molds designed to produce implants with conformation D (FIG. I) were prepared by machining and polishing operations. The overall diameter of the cavity at the periphery of the flange was 9.0 mm., the flange thickness was 0.4 mm. and a radius of curvature of the optic section on the male mold half was 6.00 mm. A radius of curvature of 7.00 mm. was prepared on the steel mold designed to produce the female mold portion.

The steel molds were positioned in an injection molding machine and male and female plastic molds were produced using polypropylene resin. The male plastic molds so produced exhibited a radius of curvature of 5.93+/−0.03 mm. in the optic area and the female plastic molds showed an optical radius of 6.92+/−0.03 mm. The outside diameter of the flange portion of the cavities on both mold halves was 8.95 mm.

EXAMPLE II

Formation of Implants

A monomer formulation containing 2-hydroxyethylmethacrylate, 99 parts; ethylene-di-methacrylate, 0.4 parts; and bis(4-t-butylcyclohexyl) peroxydicarbonate, 0.5 parts was prepared. A number of female mold halves (as in Example I) were filled (approximately 0.4 cc) with the formulation. Male mold halves were lowered into the female portion at an angle to permit escape of air and the molds were closed using light pressure to ensure filling of the reservoir volume and to expel excess monomer. The filled molds were placed, female side down, on a metal plate heated at 70° C. After 45 minutes, the molds were transferred to a convection oven, heated at 95° C. and were heated at this temperature for 2 hours.

The molds were removed, cooled and opened. Implants having optical powers of 62 to 65 diopters, unblemished surfaces and smooth peripheral flanges with diameters of 8.90 mm. were obtained. After hydration in 0.9% saline solution and autoclaving, flexible implants having an outside diameter of 10.6 mm., suitable for sulcus fixation were obtained.

EXAMPLE III

Formation of Implants

A number of molds prepared in Example I were filled with a curable 2-part transparent methyl silicone fluid formulation. Prior to closing the molds, the female portions containing the formulation were vacuum treated to remove bubbles and closure was effected as in Example II to ensure expellation of air. The molds were placed female side down on a hot plate with a surface temperature of 90° C. After two hours, the molds were cooled and opened. Flexible implants having a smooth outside diameter of 8.95 mm. and optical power in the range of 39 to 42 diopters suitable for capsular bag fixation were obtained.

EXAMPLE IV

Formation of Implants

Male and female plastic molds were prepared from a nylon-6 (polycaprolactam) resin employing the steel molds of Example I. The molds were filled with the silicone formulation of Example III in the manner described therein. The molds were placed female side down on a hot plate having a surface temperature of 120° C. After 15 minutes, the molds were cooled and opened. Similar implants were obtained.

EXAMPLE V

Formation of Molds

Stainless steel molds designed to produce implants with the configuration illustrated in FIG. 1(A) were fabricated by machining and polishing. The outside diameter (along Axis 1-2) was 11.5 mm. and the cross-section dimension of the loop portion in each mold member was hemi-ovoid with the width at the parting line made to be 0.4 mm. and the height at the apex of 0.3 mm. A groove designed to produce a projecting rim of 0.1 mm. in height was engraved along the periphery of each mold portion.

The diameter of the optic portion of the molds was 5.5 mm. and a radius of curvature of 6.00 mm. was ground on the mold half designed to produce the male mold member. A radius of 6.00 mm. was used on the opposing mold portion.

The molds were placed in an injection molding machine and male and female plastic molds were produced using polypropylene resin in the manner of Example 1. The radius of curvature obtained on the female mold parts was 5.94+/−0.04 mm. and that on the male mold parts was 6.93+/−0.03 mm.

EXAMPLE VI

Formation of Implants

Female molds produced in Example V were filled with a formulation consisting of 2-hydroxyethylmethacrylate, 84 parts; methyl methacrylate, 15 parts; ethylene dimethacrylate, 0.3 parts; and bis(4-t-butylcyclohexyl)peroxydicarbonate, 0.5 parts.

The filled female parts were treated with vacuum to remove dissolved air and the molds were closed with the male molds in a manner to exclude air and to displace excess monomer.

The molds were placed female side down on a hot plate, having a surface temperature of 60° C. for 3 hours. The molds were cooled and opened carefully to avoid fracturing the relatively delicate loop portion of the polymerizate. The castings as removed from the mold had an outside diameter (along Axis 1-2) of 11.4 mm., an ovoid loop cross section of 0.4×0.7 mm. and optical powers in the range of 60 to 64 diopters. After hydration in physiological saline and autoclaving, the diameter of the implant (along Axis 1-2) was 12.8 mm. and the diameter of the optic zone was 6.1 mm.

A mechanical force of 80 milligrams was required to cause a 1 mm. compression of the loop members.

EXAMPLE VII

Formation of Implants

Example VI was repeated, substituting a formulation of 2-hydroxyethyl methacrylate, 50 parts; methyl methacrylate, 50 parts; ethylene dimethacrylate, 0.4 parts; and bis(4-t-butylcyclohexyl)peroxydicarbonate, 0.5 parts.

After hydration in physiological saline and autoclaving, the implants had a major diameter (Axis 1-2) of 12.6 mm. and the diameter of the optic portion was 6.0 mm. A mechanical force of 120 mg. was required to cause a 1.0 mm. compression deflection of the loop members of the implant.

I claim:

1. A thermoplastic mold for producing an intraocular implant, said implant comprising a lens portion and support means therefore, for holding said implant in place when inserted intraoccularly, said mold comprising:
   (a) a male portion comprising a core having a cavity therein said cavity having
      (i) a first molding surface having a principle longitudinal axis and having a predetermined curvature to form a first surface of said desired lens portion of said implant said core having
      (ii) a second molding surface, opening into said first molding surface and having a predetermined shape to provide a first surface of said support means and
      (iii) a first thin, flexible rim means having a lower edge, surrounding the outer periphery of said surfaces, and
   (b) a female portion comprising a core having a cavity therein and a core ring surrounding said core, said cavity having
      (i) a third molding surface having a principle longitudinal axis orientable coaxially with the principle longitudinal axis of said first molding surface, and having a predetermined curvature to form a second surface of said desired lens portion of said implant said core having
      (ii) a fourth molding surface, opening into said third molding surface and having a predetermined shape to provide a second surface of said support means and
      (iii) a second thin, flexible rim means having an upper edge, surrounding the edges of said third and fourth molding surfaces,
   said second and said fourth molding surfaces opening in to said first and said third molding surfaces respectively at least two distinct locations,
   the rim means of said male and female portions being contactable at said lower and upper edges to form a contact seal therebetween and form the outer edges of said implant and a reservoir means for holding excess monomer being thus provided between said male core, said female core ring, the portion of said female core outside said rim means and both of the said rim means in contact with each other.

2. A mold of claim 1 wherein said male portion further comprises a core lip surrounding said core.

3. A mold of claim 2 wherein lower edge of said core lip contacts the upper edge of said core ring.

4. A mold of claim 1 wherein said rim means are provided with an inner face and an outer face having a common edge therewith and subtending an angle of 10° to 30° thereto at said common edge.

5. A mold of claim 1 wherein said rim means are each provided with an inner face and an outer face, the inner faces thereof subtending an angle of at least 180° to each other at their line of contact.

6. A mold of claim 1 wherein said second and said fourth molding surfaces open into said first and said third molding surface respectively around the entire peripheries of said first and said third molding surfaces.

7. A mold of claim 1 wherein said second and said fourth molding surfaces open into said first and said third molding surfaces respectively at between two and four locations.

8. A mold of claim 1 further comprising orienting means on said male and female portions to provide that when said mold portions are brought into mutual contact, the rim means thereof form a contact seal.

9. A thermoplastic mold for producing an introcular implant, said implant comprising a lens portion and support means for holding said implant in place when inserted intraoccularly therefore, said mold comprising:
   (a) a male portion comprising a core having a cavity therein said cavity having
      (i) a first molding surface having a principle longitudinal axis and having a predetermined curvature to form a first surface of said desired lens portion of said implant and said core having
      (ii) a second molding surface, opening into said first molding surface and having a predetermined shape to provide a first surface of said support means and
      (iii) a first thin, flexible rim means having a lower edge, surrounding the outer periphery of said surfaces, and
   (b) a female portion comprising a core having a cavity therein and a core ring surrounding said core, said cavity having
      (i) a third molding surface having a principle longitudinal axis orientable coaxially with the principle longitudinal axis of said first molding surface, and having a predetermined curvature to form a second surface of said desired lens portion of said implant and said core having
      (ii) a fourth molding surface, opening into said third molding surface and having a predetermined shape to provide a second surface of said support means and
      (iii) a second thin, flexible rim means having an upper edge, surrounding the edges of said third and fourth molding surfaces,
   the rim means of said male and female portions being contactable at said lower and upper edges to form a contact seal therebetween and form the outer edges of said implant and a reservoir means for holding excess monomer being thus provided between said male core, said female core ring, the portion of said female core outside said rim means and both of said rim means in contact with each other,
   said rim means being each provided with an inner face and an outer face, said inner faces subtending an angle of at least 180° C. to each other at their line of contact,
   said male portion further comprising a core lip surrounding said core, wherein the lower edge of said core lip contacts the upper edge of said core ring.

10. A mold of claim 9 wherein said rim means are provided with an inner face and an outer face having a common edge therewith subtending an angle of 10° to 30° thereto at said common edge.

11. A mold of claim 9 wherein said second and said fourth molding surfaces open into said first and said third molding surfaces respectively around the entire peripheries of said first and said third molding surfaces.

12. A mold of claim 9, wherein said second and said fourth molding surfaces open into said first and said third molding surfaces respectively at between two and four locations.

13. A mold of claim 9 wherein said second and said fourth molding surfaces into said first and said third molding surfaces respectively at between two and four locations.

14. A mold of claim 9 further comprising orienting means on said male and female portions to provide that when said mold portions are brought into mutual contact, the rim means thereof form a contact seal.

* * * * *